(12) United States Patent
Jenkins et al.

(10) Patent No.: US 7,381,009 B2
(45) Date of Patent: Jun. 3, 2008

(54) STARTER MODULE FOR WALK BEHIND TROWEL

(75) Inventors: Michael Jenkins, Slinger, WI (US); Gregory Kruepke, Waukesha, WI (US); Michael Ochalek, Mequon, WI (US)

(73) Assignee: Wacker Corporation, Menomonee Falls, WI (US)

( * ) Notice: Subject to any disclaimer, the term of this patent is extended or adjusted under 35 U.S.C. 154(b) by 122 days.

(21) Appl. No.: 10/704,486

(22) Filed: Nov. 7, 2003

(65) Prior Publication Data

US 2005/0100405 A1    May 12, 2005

(51) Int. Cl.
*E01C 19/22*   (2006.01)
(52) U.S. Cl. .................................... 404/894.1
(58) Field of Classification Search ............... 404/84.1, 404/112
See application file for complete search history.

(56) References Cited

U.S. PATENT DOCUMENTS

| 4,232,980 | A | * | 11/1980 | Tertinek et al. | 404/112 |
| 4,553,517 | A |   | 11/1985 | Andreasson | |
| 4,629,359 | A | * | 12/1986 | Sengupta | 404/112 |
| 5,405,216 | A | * | 4/1995 | Allen et al. | 404/112 |
| 6,595,697 | B2 |   | 7/2003 | Dykstra et al. | |
| 6,739,798 | B2 | * | 5/2004 | Vandewinckel et al. | 404/112 |
| 7,004,676 | B2 | * | 2/2006 | Williams | 404/112 |

* cited by examiner

*Primary Examiner*—Gary S Hartmann
(74) *Attorney, Agent, or Firm*—Boyle Fredrickson S.C.

(57) ABSTRACT

A starter module configured to limit an engine speed of an engine for a walk behind trowel at time of startup. The walk behind trowel includes a rotor driven by the engine, a throttle to command an operating state of the walk behind trowel, and a clutch operable to selectively couple an output of the engine to the rotor. The starter module includes a sensor operable to provide a signal representative of an operating state of the trowel upon engine start-up. The starter module further includes a controller configured to receive the signal representative of the operating state of the walk behind trowel, and to prevent the clutch from engaging the engine output to drive the rotor if the detected operating state is outside of a designated range for idling operation of the engine.

28 Claims, 8 Drawing Sheets

STARTER MODULE FOR WALK BEHIND TROWEL

BACKGROUND OF THE INVENTION

1. Field of the Invention

The invention relates to a starter module for a walk behind trowel, and, more particularly, relates to a module that limits engine speed based on throttle position at time of starting the walk behind trowel.

2. Discussion of the Related Art

Walk behind trowels are generally known in the finishing of concrete surfaces. A walk behind trowel generally includes a rotor formed from a plurality of trowel blades that rest on the ground. The rotor is driven by a motor to provide a smooth, finished surface on the poured concrete. The motor is mounted on a frame or "cage" that overlies the rotor. The trowel is controlled by an operator via a handle extending several feet from the cage. Engine speed is controlled by a throttle located on the handle.

Walk behind trowels have several drawbacks. For instance, the rotating blades impose substantial torque on the cage. The torque must be counteracted by operator-imposed forces on the handle in order to prevent the cage from rotating. This need for manual control presents a challenge at start-up. The typical walk-behind trowel is manually started by pulling a pull cord on the engine. The pull cord is located near the engine and several feet from the end of the handle. Hence, an operator cannot start the engine and control the trowel simultaneously. Loss of control is avoided by providing a clutch that must be engaged before the rotor is driven to rotate, permitting the operator to start the engine and station oneself behind the handle before engaging the clutch.

However, the typical walk behind trowel employs a centrifugal clutch that engages automatically when the engine speed exceeds a designated value that is above an idle operating range. If the engine is started and exceeds that speed before the operator grasps the handle, the clutch may engage before the operator can station himself behind the handle to control the trowel. Some trowels address this problem by employing a dead man switch or lever at the handle that must be depressed to engage the clutch. However, the effort required to operate the dead man switch can be fatiguing and also hinders the operator's ability to grasp the handle in a manner that optimizes the operator's ability to steer the trowel.

In light of the foregoing, a walk behind trowel is desired that prevents uncontrolled rotation of the trowel at time of startup.

OBJECTS AND SUMMARY OF THE INVENTION

The present invention provides an improved walk behind trowel for finishing concrete. The improved walk behind trowel includes a starter module that prevents the clutch from engaging rotation of a rotor at the time of startup of the engine.

In accordance with a first aspect of the invention, one or more of the above-identified needs is met by providing a starter module for an engine for a walk behind trowel. The walk behind trowel includes a rotor driven by the engine, a throttle to command an operating state of the walk behind trowel, and a clutch operable to selectively couple an output of the engine to the rotor. The starter module includes a sensor operable to provide a signal representative of an operating state of the trowel upon engine start-up. The starter module further includes a controller configured to receive the signal representative of the operating state of the walk behind trowel, and to prevent the clutch from engaging the engine output to drive the rotor if the detected operating state is outside of a designated range.

In accordance with a second aspect of the invention, a walk behind trowel includes an engine operable to provide an engine output. The trowel further includes a throttle operable to regulate an engine operating speed, and a rotor driven by the engine output. The trowel further includes a clutch selectively engageable to couple the output of the engine to drive the rotor. The trowel yet further includes a controller configured to detect an operating state of the trowel, and to prevent the clutch from engaging if the detected operational state is outside a designated range.

In accordance with a third aspect, a method of regulating a walk behind trowel having an engine operable to provide an engine output, a starter to ignite the engine, a rotor, a clutch engageable to couple the engine output to drive the rotor. The method includes the acts of detecting an operating state of the engine, and preventing engagement of the clutch if the operating state is outside a designated range.

The benefits provided by the starter module are particularly (but by no means exclusively) applicable to walk behind trowels. Hence, in accordance with other aspects of the invention, a starter module configured at least generally as described above and a walk behind trowel equipped with such a starter module are additionally provided.

Other objects, features, and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of starter modules for miscellaneous equipment could be constructed in accordance with the invention as defined by the claims. Hence, while preferred embodiments of the invention will now be described with reference to a walk behind trowel, it should be understood that the invention is in no way so limited. For instance, it is also usable with a variety of a variety of different machinery (e.g., a snowblower, an auger, etc.).

Figure 1:
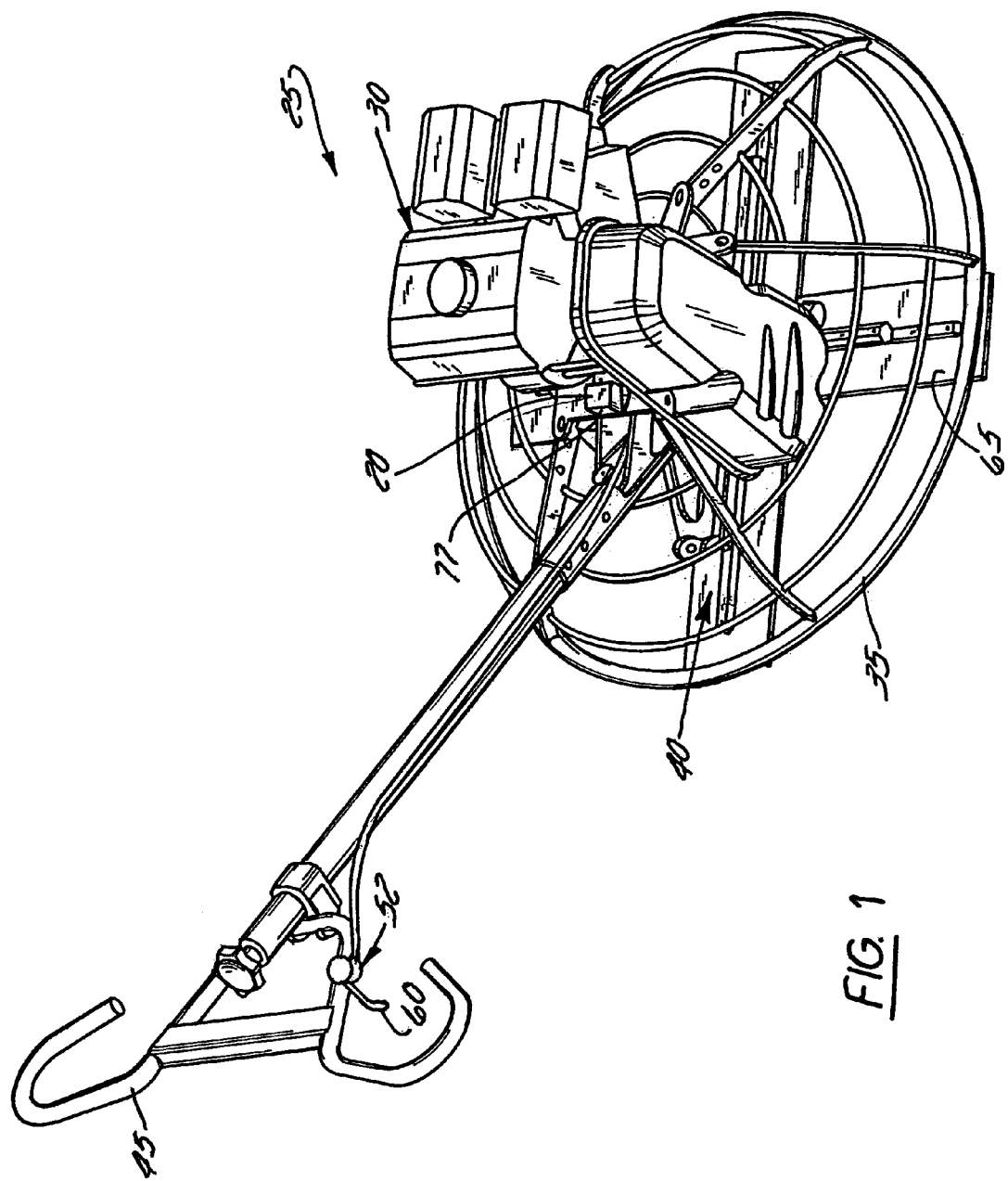
FIG. 1 is perspective view of a walk behind trowel and attached starter module constructed in accordance with a preferred embodiment of the present invention.

Referring to FIG. 1 is a perspective view of a starter module 20 in accordance with one embodiment of the invention connected to a walk behind trowel 25. In general, the walk behind trowel 25 includes an engine 30 mounted on a frame or "cage" 35 overlying a rotor 40. The trowel 25 is controlled by an operator via a handle 45 extending several feet from the cage 35.

The engine 30 generally includes a starter 50, a throttle 52, and a clutch. Typically, the starter 50 includes a starter cord 55 manually engaged by the operator to start-up operation of the engine 30. The throttle 52 includes a throttle lever 60, typically positioned on the handle 45 and is operable to set a command speed for operating the engine 30. In one embodiment, the throttle regulates a governor in feeding fuel to the engine 30. The governor feeds the fuel at a rate aimed at generating an actual operating speed of the engine 30 according to the commanded speed set by the throttle position. In another embodiment, the set commanded speed of the throttle regulates a carburetor in controlling a flow of a fuel/air mixture to the engine. The type of device to set the command speed of the engine 30 can vary.

The clutch may be any structure configured to transfer drive torque from the engine output shaft to the rotor input shaft. In the illustrated embodiment, it comprises a centrifugal clutch (not shown) coupled to the motor output shaft and a gearbox that transfers torque from the clutch to the rotor input shaft.

The engine 30 further includes an ignition system to spark the engine. One embodiment of the ignition system includes a magneto ignition (not shown). The magneto ignition includes a magnet that rotates with the engine output and generates a magnetic flux change in the magneto ignition with every engine cycle to power an ignition coil (not shown). The ignition coil provides an electrical output that is sufficiently strong to power a spark plug. The position of the throttle regulates the frequency of the electrical signal or pulse train from the magneto ignition to the ignition coil to spark and drive operation of the engine.

Figure 2:
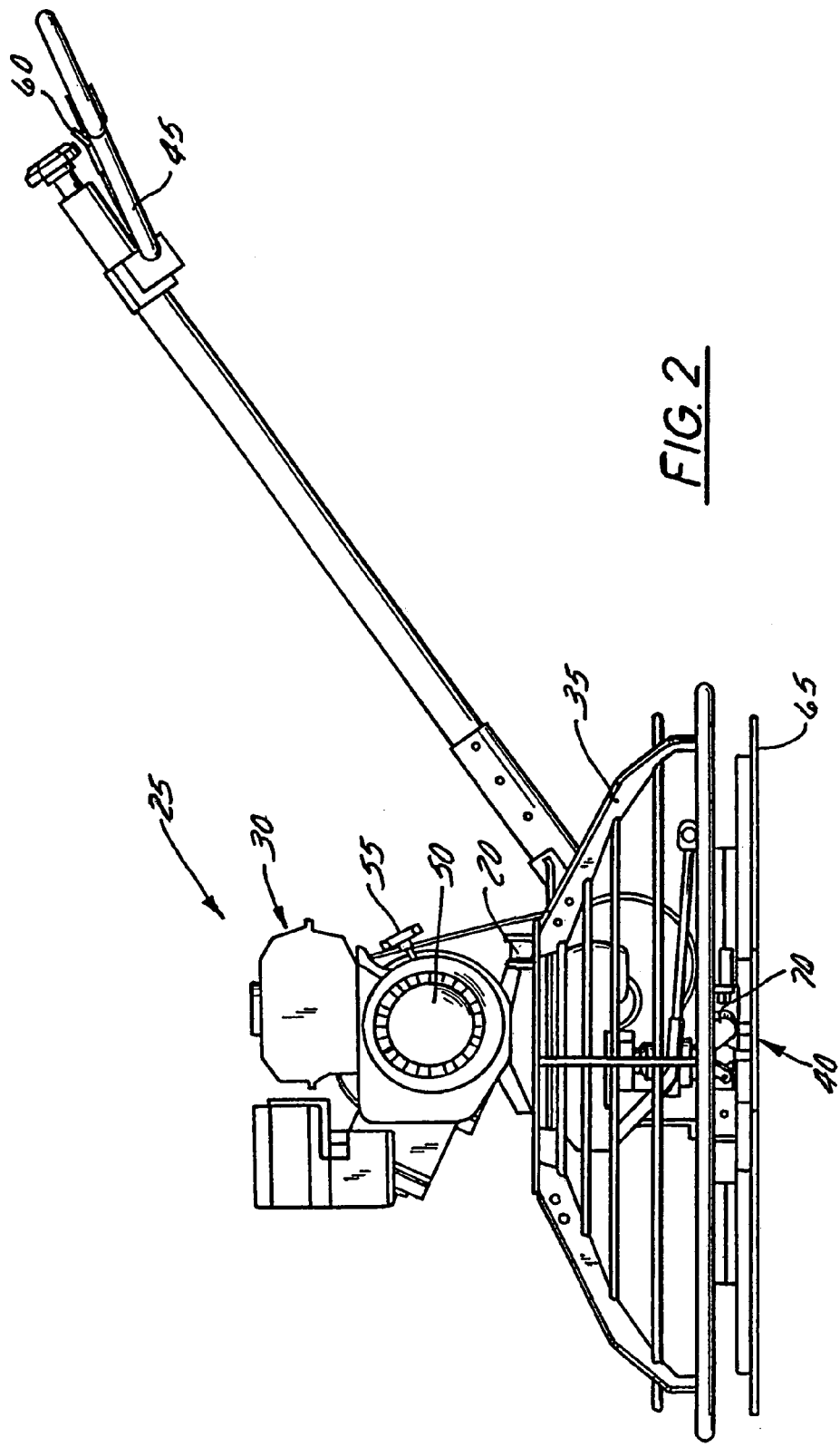
FIG. 2 is a side elevation view of the walk behind trowel of FIG. 1.

Referring to FIG. 2, the rotor 40 includes a plurality of trowel blades 65 extending radially from a hub 70 which, in turn, is driven by a vertical shaft (not shown). The shaft of this embodiment comprises the gearbox output shaft. Alternatively, the shaft could be coupled to the gearbox output shaft either directly or via an interfering torque transfer arrangement.

The operating state for idling operation of the engine 30 is within a designated range of engine speed. One embodiment of the designated range for idling operation is slightly beneath a designated threshold speed to engage the clutch. Beneath the designated threshold (e.g., about 1200–1600 rpm), the clutch does not engage. At or above the designated threshold (e.g., about 1700 rpm), the clutch engages to couple the engine output to drive the rotor 40.

Pursuant to a preferred embodiment of the invention, a starter module 20 is configured to prevent the engine speed from exceeding the designated threshold for engaging the clutch. The starter module 20 includes a housing 77 and is positioned on the engine mount of the cage 14. The type of housing 77 and position on the trowel 25 can vary.

a. Circuitry

Figure 3:
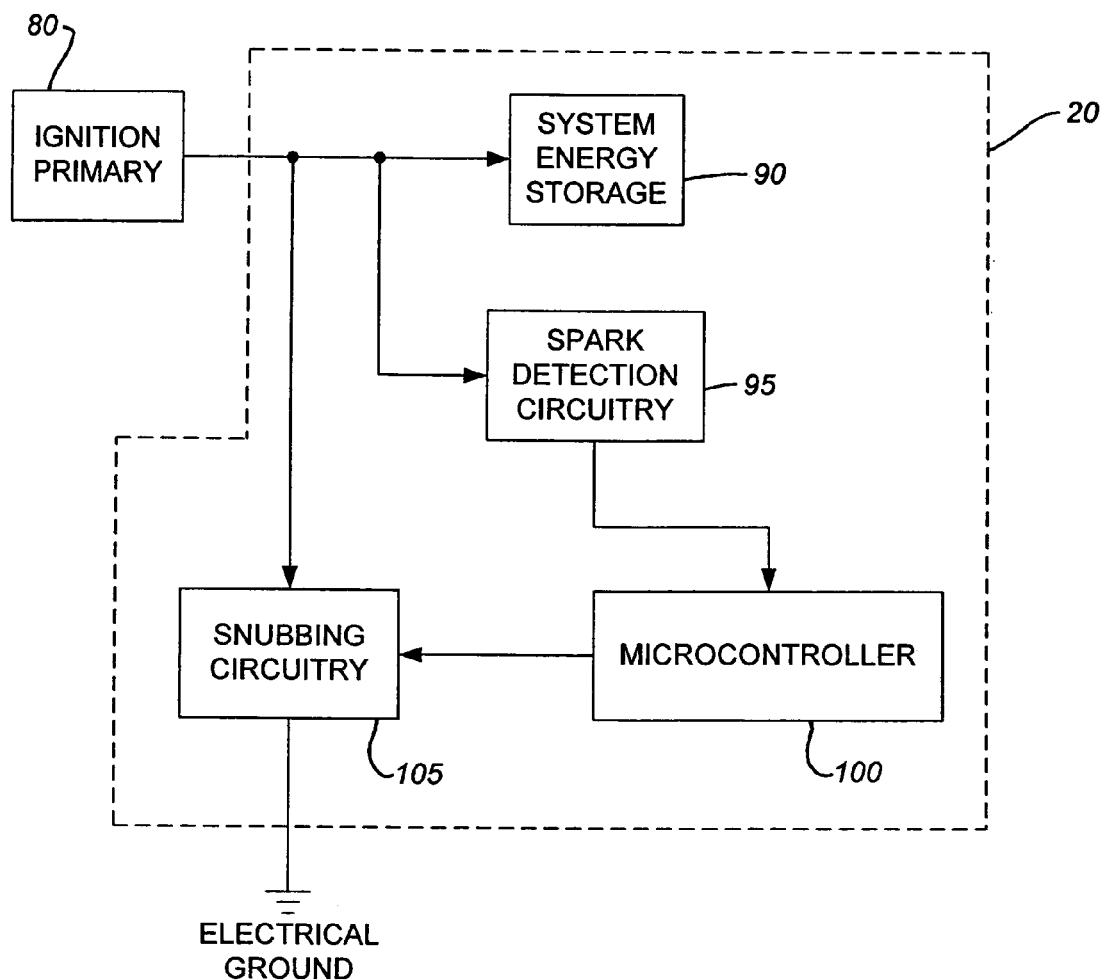
FIG. 3 is a schematic diagram of a starter module constructed in accordance with the present invention.
Figure 4:
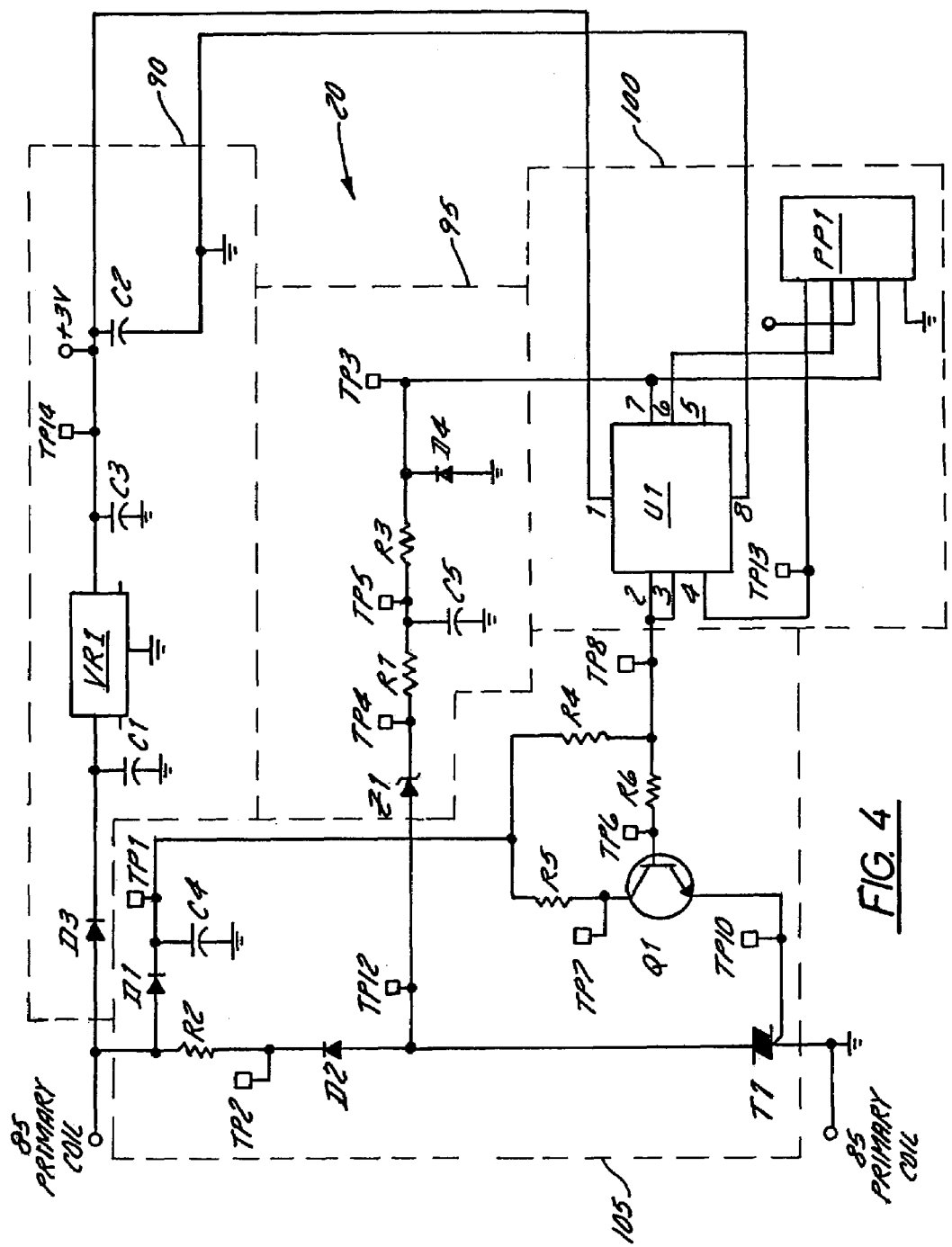
FIG. 4 is circuit diagram of the starter module of FIG. 1.

FIGS. 3 and 4 show the detailed embodiment of the starter module 20 of the present invention. The following sections describe the functions of the individual circuit blocks shown in FIG. 3. Each circuit block represents a circuit function. Refer to the circuit diagram in FIG. 4 for information on the circuit block locations and interconnectivity.

The starter module 20 is electrically connected to and receives electrical power from the electrical signals or pulses transmitted from the ignition system 80. In one embodiment, the starter module 20 is electrically connected in parallel with a primary ignition coil 85 of the ignition system 80. The primary ignition coil 85 receives an alternating current (AC) signal including a frequency of electrical pulses with about a 100V amplitude to drive operation of the engine. The frequency of electrical pulses to the primary coil 85 is interrelated to the cycling of the engine 30. As described above, the cycling of the engine 30 drives the magneto ignition to generate the plurality of electrical pulses to the primary ignition coil 85. The primary ignition coil 85 is configured with a secondary coil (not shown) to provide the high voltage (e.g., 10,000 volts) across a spark plug for igniting combustion of the engine 30.

Referring to FIGS. 3 and 4, a system energy storage block 90 (diode D3, capacitors C1, C2, and C3, linear voltage regulator VR1) generally provides a low voltage power supply to the starter module 20 using the electrical pulses or signals to the primary ignition coil 85. Capacitors C1 and C3 and linear voltage regulator VR1 provide protection for a microcontroller U1 (discussed later) from surges of electrical power generated in the electrical pulses. Diode D3 prevents the electrical energy stored in capacitor C1 from discharging to the primary ignition coil 85.

Figure 5:
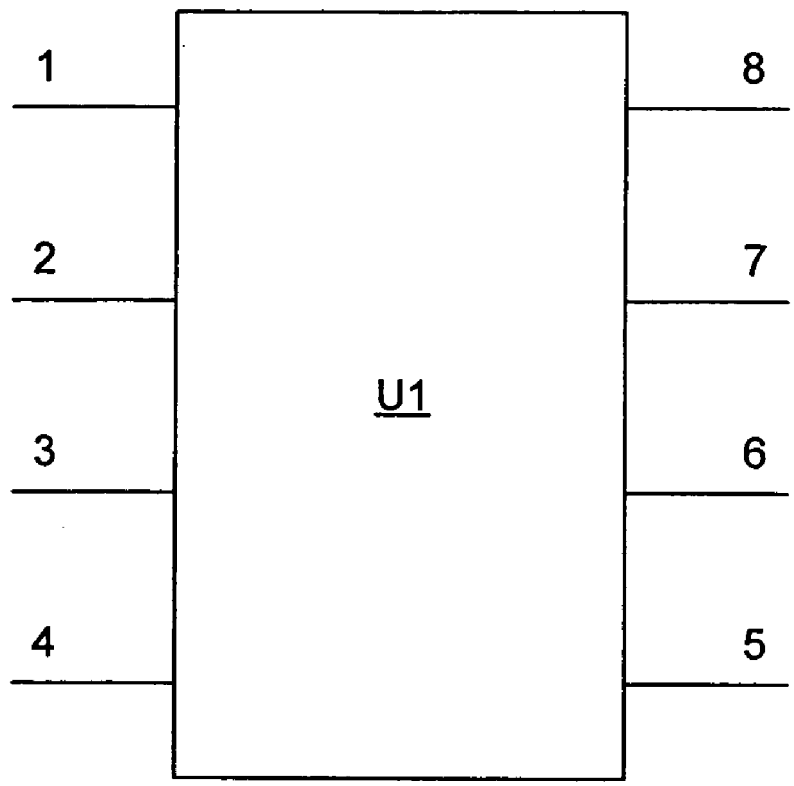
FIG. 5 is a schematic diagram of the pin connections of the controller U1 in FIG. 4.

A spark detection circuit 95 (zener diode Z1, diode D4, capacitor C5, and resistors R1 and R3) senses and conditions the electrical pulses to the primary ignition coil 85, and transmits the sensed electrical pulse signals to a controller 100. Zener diode Z1 qualifies the incoming spark pulses, while resistor R1 and capacitor C5 filter the electrical signals and resistor R3 and diode D4 limit the voltage of the electrical pulses for transmission to the data input pin P7 (See FIG. 5) of the microcontroller U1.

A snubbing circuit 105 (resistors R2, R4, R5, R6, transistor Q1, diodes D1 and D2, capacitor C4, and triac T1) is configured to electrically snub (i.e., shunt to electrical ground) the electrical pulses to the ignition coil 85 unless commanded not to do so by the controller 100. Diode D1 prevents the energy built-up in capacitor C4 from discharging to the primary ignition coil 85. As the transistor Q1 conducts, capacitor C4 and resistor R5 provide the necessary output of voltage and current to activate the triac T1. The activation of the triac T1 electrically snubs at least a portion of the electrical pulses transmitted to the primary coil 85 for sparking the engine 30. The snubbing of the electrical pulses inhibits ignition of the engine 30 and prevents the actual engine speed from exceeding the designated range for idle such that the clutch does not engage.

The controller 100 is a programmable, integrated component that generally consolidates and controls many of the functions of the starter module. The functions provided by the controller 100 include: (1) determining an operating state of the trowel 25; (2) comparing the operating state to a designated threshold; and (3) preventing the engine 30 output from driving the rotor 40 to rotate if the operating state is at or above the designated threshold. If the operating state is at or above the designated threshold, the controller 100 monitors and controls activation of the snubbing circuit 105 in electrically snubbing the electrical pulses to the primary coil 85. Thereby, the controller 100 prevents the clutch from engaging to drive rotation of the rotor 40.

The controller 100 includes a microcontroller U1 electrically connected to receive electrical pulse signals from the sensing circuit block and electrically connected to regulate operation of the snubbing circuitry. The microcontroller U1 is also electrically connected to a programming port PP 1 for programming the microcontroller with software instructions to perform many of the functions of the starter module. A preferred embodiment of the microcontroller U1 is a Model No. PIC12F675, manufactured by MICROCHIP TECHNOLOGY, INC.™ Other microcontrollers can be used alone and/or in combination with discrete components and/or circuits to perform the functions of microcontroller U1. The microcontroller U1 could also be entirely replaced by such discrete components and/or circuits.

b. Circuit Operation

The detection circuit 95 senses the electrical pulses transmitted to the ignition coil 85 and conditions the electrical pulses for transmission to the controller 100. The controller 100 determines the operating state of the engine 30. In one embodiment, the operating state is a commanded speed set by the throttle position. The controller 100 determines the commanded speed based on the frequency of the electrical pulses sensed by the detection circuit 95. If the controller 100 determines the commanded speed of the trowel 25 is at or above a designated threshold for idling operation of the engine 30, the controller 100 ceases to disable activation of transistor Q1, allowing Q1 to provide the necessary electrical output to activate the triac T1. The activated triac T1 electrically snubs at least a portion of the electrical pulses to the ignition coil 85, limiting the actual engine speed of the trowel 25. The controller's regulation of transistor Q1 regulates the portion of electrical pulses snubbed by the triac T1.

c. Programmed Operation

Figure 6:
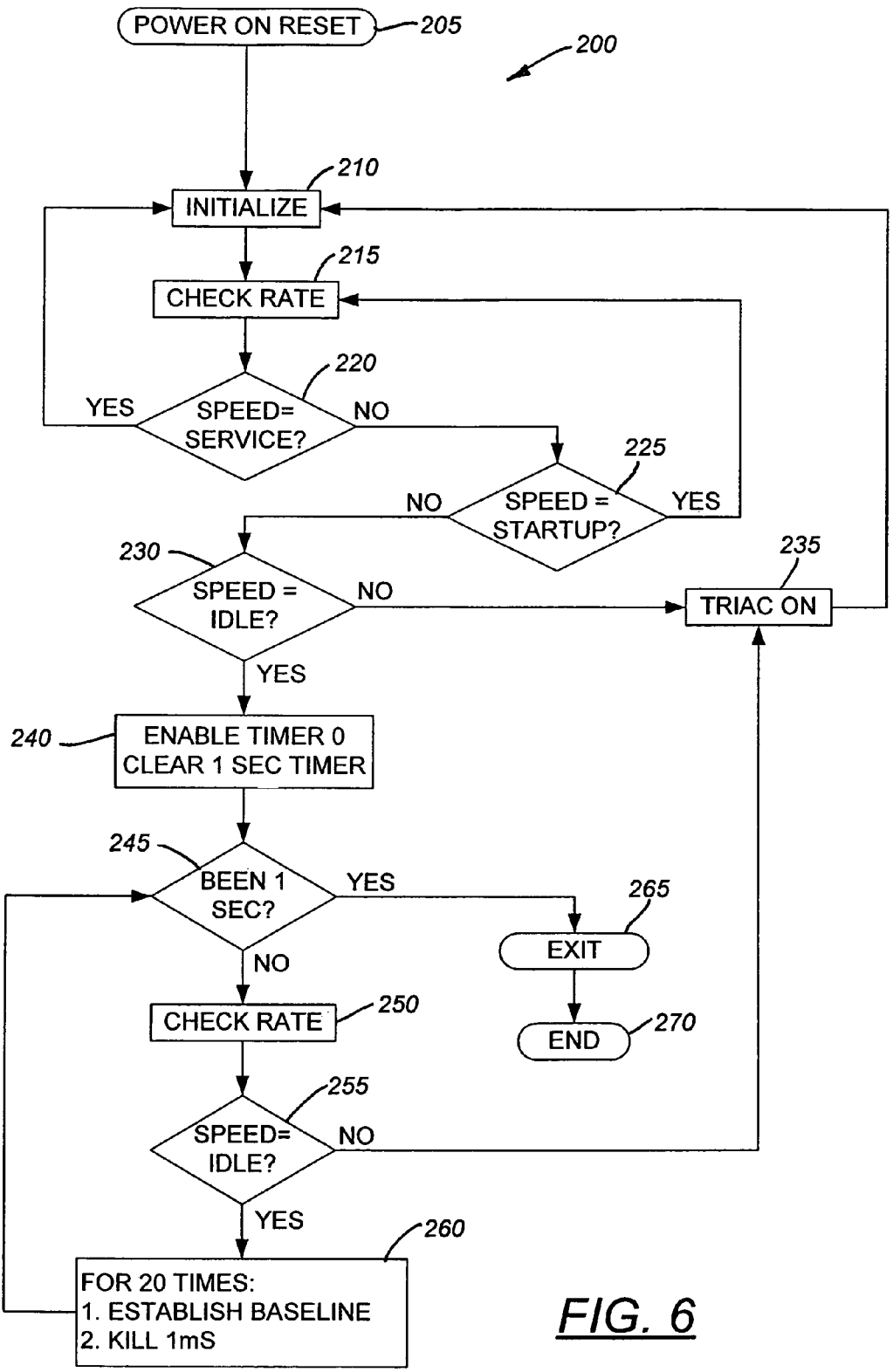
FIG. 6 is a flow diagram of a first embodiment of a method of operation of the starter module of FIG. 1.

Having described the basic architecture of the starter module 20 of the present invention, a method 200 of operation of the starter module 20 will now be described as shown in FIG. 6. It is envisioned that the method 200 of operation can be modified for other embodiments of the starter module 20. Furthermore, it is envisioned that not all the acts may be required, that some of the acts may be modified, or that the order of the acts may vary.

As shown in FIG. 6 and at act 205, an operator pulls the manual starter cord 55 to start the engine 30. The operation of the engine 30 provides electrical power to the starter module 20. At act 210, the controller 100 initializes. Initializing the controller 100 includes disabling timer interrupts, disabling optional internal functions, setting direction of outputs, enabling inputs, clearing variables, and setting internal timers.

At act 215, the controller 100 determines an engine speed, preferably by determining a rate or a frequency of the electrical pulse signals sensed by the detection circuit 95. In one embodiment, determining the frequency of the electrical pulses is performed by detecting the time period between the falling edges of the electrical pulse signals. The method of measuring the time period between electrical pulses can vary. The controller 100 performs this act for a predetermined time interval (e.g., up to 200 ms where no pulse signals are to be detected). However, the controller 100 does not check the frequency of pulses that are snubbed or electrically grounded.

The controller 100 translates the frequency of the sensed electrical pulses into the commanded speed set by the throttle 52 position. The magneto ignition generates electrical pulses to spark the engine with each cycle or revolution of the engine output. So, a time period of 50 milliseconds between electrical pulses translates to a pulse frequency of 20 Hz and a commanded engine speed of 1200 rpm.

At act 220, the controller 100 determines whether the lack of electrical pulse signals is such that DC power is being applied (Service Mode), in which case the control 100 re-initializes at act 210.

At act 225, the controller 100 determines whether the engine 30 has reached a predetermined startup speed before analyzing the commanded speed set by the throttle 52. If the detected pulses frequency is below a predetermined startup speed programmed into the controller 100, the controller 100 continues to check the rate of the electrical pulse signal at act 215.

At act 230, the controller 100 determines whether the commanded speed set by the throttle 52 position is at or above a predetermined threshold programmed into the controller 100. In one embodiment, the designated threshold is defined to be 1700 rpm (±100 rpm), which translates to a time period between sensed electrical pulses of about 35.3 milliseconds (mS).

Figure 7:
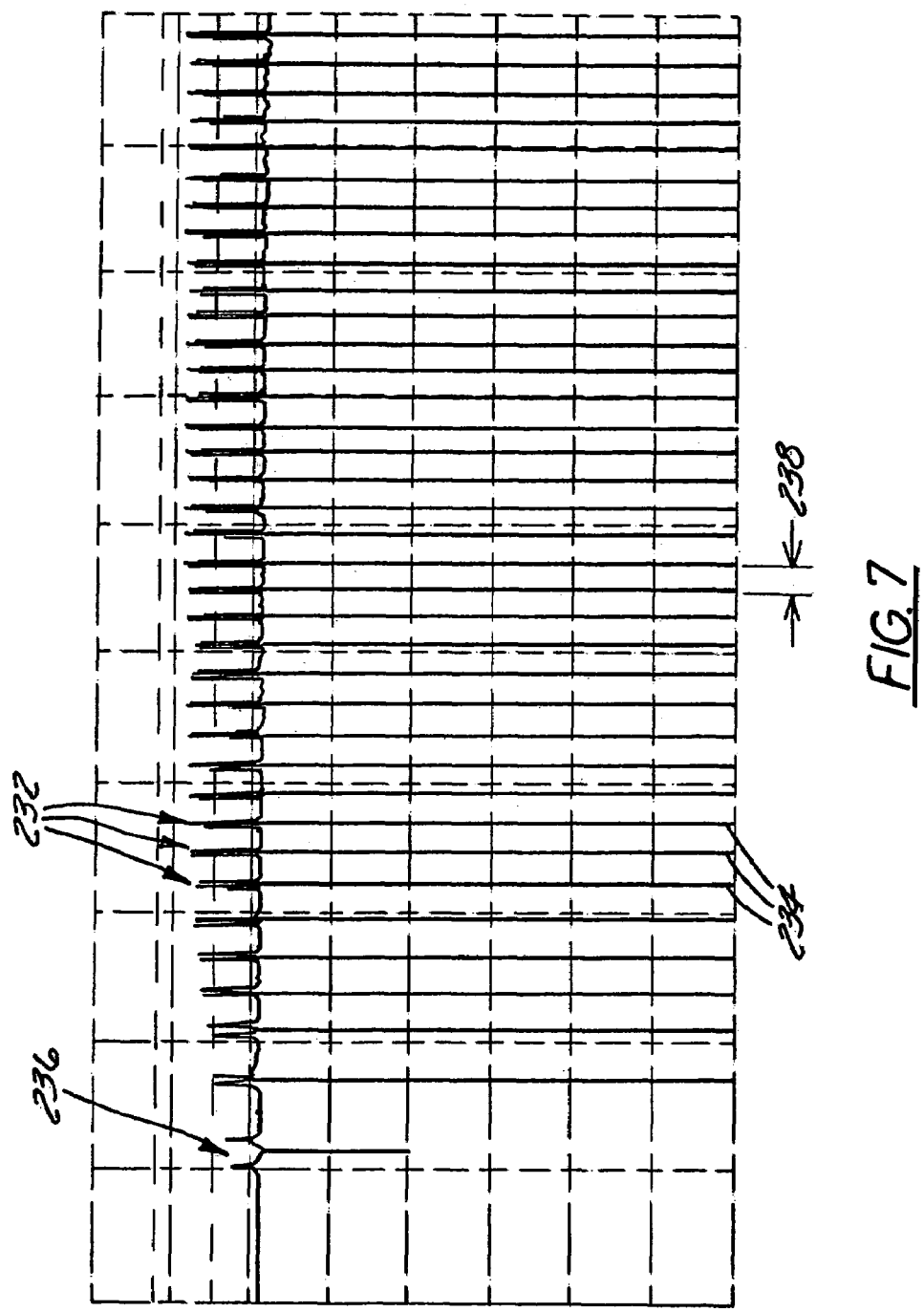
FIG. 7 is a timing diagram illustrating an electrical pulse train in accordance to a commanded speed within an idle operating range in accordance with the present invention.

FIG. 7 shows a timing diagram illustrating a series of electrical pulses 232 transmitted to the primary coil 85 of an engine 30 at time of startup. The controller 100 translates the measured period between the falling edges 234 of the electrical pulses into the command speed set by the throttle 52 position. The initial electrical pulse train 236 relates to the pull of the starter cord 55. A time period 238 between electrical pulses gradually decreases as the engine attempts to reach the commanded speed set by the throttle 52. In FIG. 7, the throttle 52 position is set at a low commanded speed such that the minimum time period between electrical pulses is about 44 milliseconds (mS) ±5 mS per revolution of the engine, which translates to a command speed of about 1,360 rpm. Since the command speed never exceeds the designated threshold to engage the clutch, the controller does not electrically snub the electrical pulses to spark the engine 30.

If the controller 100 determines the commanded speed is at or above the designated threshold, the controller 100 ceases to disable Q1, which activates the triac T1, which in turn electrically snubs the electrical pulses to the ignition coil 85 (act 235). Electrically snubbing at least a portion of the electrical pulses to the ignition coil 85 maintains the actual engine speed beneath the designated threshold for idle operation of the engine 30. The controller 100 electrically snubs all but a portion of electrical pulses to still sustain operation of the engine 30.

Figure 8:
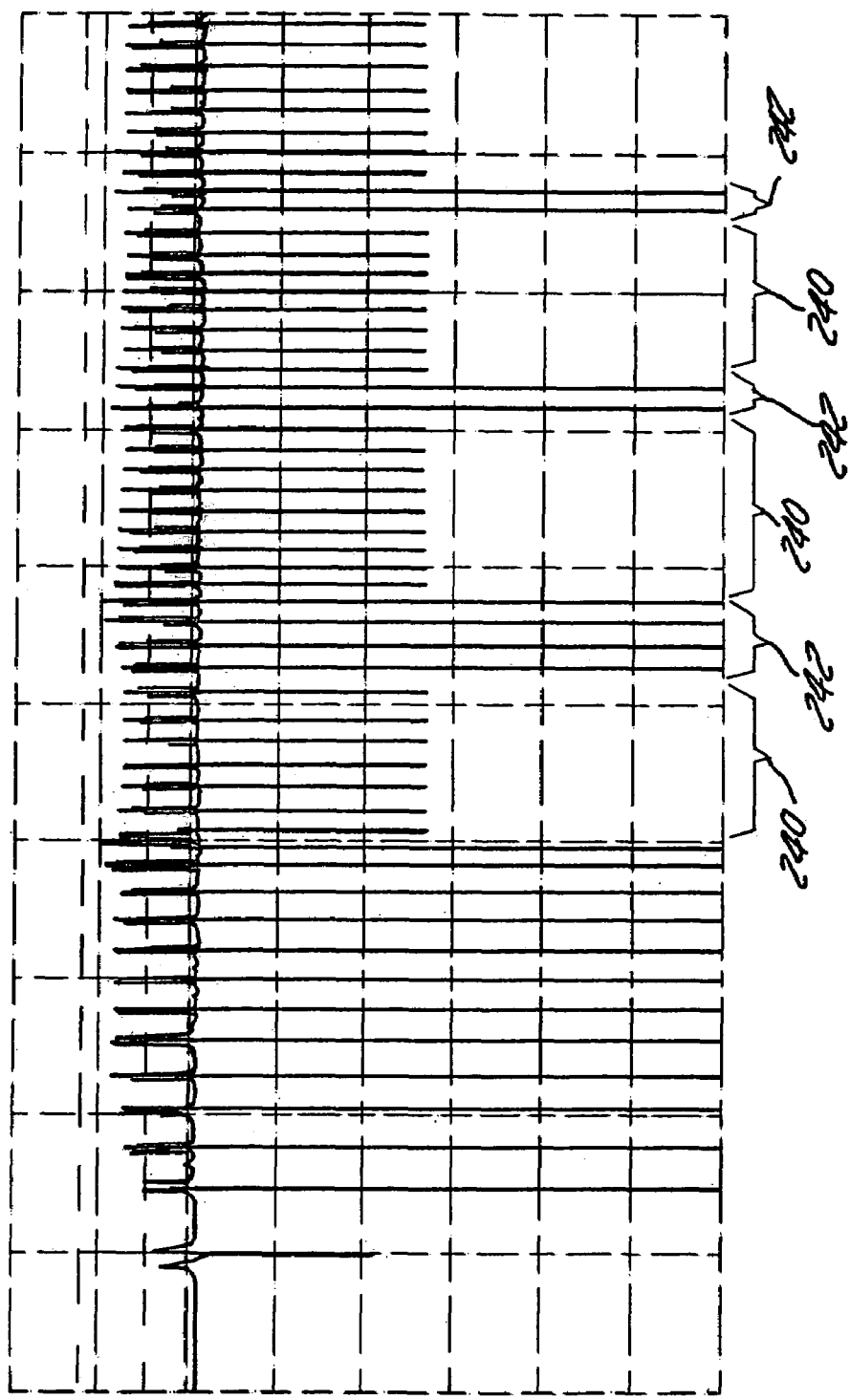
FIG. 8 is a timing diagram illustrating snubbing a portion of electrical pulses in accordance with the present invention.

As shown in FIG. 8, the throttle 52 of the engine 30 is set at a full commanded speed at time of startup. The controller 100 measures the time period between electrical pulses to fall as low as about 31.6 mS, translating to a command speed of about 1900 rpm. Since the commanded speed is at or above the designated threshold, the controller 100 electrically snubs a portion 240 of the electrical pulses to spark the engine 30. The snubbed portion 240 of electrical signals maintains the actual engine speed below the designated threshold. The controller 100 continues to snub until the commanded speed of the throttle 52 position is reduced to command an engine speed below the designated threshold for engaging the clutch.

One embodiment of the controller 100 electrically snubs 8 out of 10 electrical pulses to the primary ignition coil 8 of the engine. The remaining unsnubbed electrical pulses 242 are successive and sustain operation of the engine 30. The portion of snubbed electrical pulses 240 can vary.

Referring again to FIG. 6, the controller 100 continues to instruct the triac T1 to electrically snub the electrical pulses for a predetermine time period (e.g., 250 ms), and then re-analyzes the commanded speed by returning to act 210. The controller 100 continues to command the snubbing of the electrical signal to the ignition coil 85 until the controller 100 detects that the commanded speed set by the throttle 52 position is reduced is below the predetermined designated threshold, which is idling operation of the engine 30.

If the controller 100 determines the commanded speed is below the designated threshold, the controller 100 measures a predetermined time period for the throttle 52 to be set below the designated threshold for a predetermined time period (e.g., one second). The controller 100 enables an internal timer (act 244) and checks that the commanded speed is below the designated threshold through an iterative routine for the predetermined time period before allowing the operator to increase the actual speed of the engine 30 at or above the designated threshold such that the clutch can engage the engine output to rotate the rotor and attached trowel blades 65 (act 245).

If an operator reduced the throttle 52 position from an initial clutch engagement speed to within the idling operation range, the controller 100 continues to electrically snub the electrical pulses to the ignition of the engine 30. During the requisite idling time period (act 245), the controller 100 re-checks the pulse frequency (act 250) and compares the commanded speed set by the throttle 52 to the range of idling speed programmed into the controller 100 (act 255). If the controller 100 detects the frequency exceeding the idle frequency range, the controller 100 returns to act 235 and continues to electrically snub the electrical pulses to the ignition coil 85.

If the controller 100 detects the commanded speed is in the idling operating range, then the controller 100 averages the running value of sensed frequency of electrical pulses with a predetermined baseline value programmed into the controller 100 (act 260). Thereby, the controller 100 uses an adjusted baseline value for the idling operating range in analyzing subsequent sensed electrical pulses to the ignition coil 85. The controller 100 iterates (e.g., 20 iterations) through a subroutine for the predetermined idling time period (e.g., 1 second).

If the commanded speed is in the idling operating range for the predetermined idling period (at 245), then, the controller 100 exits this startup mode of operation (act 265). Exiting the startup mode enables the operator to change the throttle 52 position and increase the commanded speed such that the clutch engages the engine output to rotate the rotor 40 at a speed commanded by the throttle 52. Act 270 includes the end of the method 200 of the startup mode of operation of the trowel 25.

As indicated above, many changes and modifications may be made to the present invention without departing from the spirit thereof. The scope of some of these changes is discussed above. The scope of others will become apparent from the appended claims.

We claim:

1. A starter module for an engine for a walk behind trowel, the walk behind trowel having a rotor including a rotatable shaft and plurality of concrete-finishing blades that rotate with the shaft, the shaft being driven by an engine the engine having a throttle to command an operating state of the trowel, and a clutch operable to selectively couple an output of the engine to the rotor, the starter module comprising:

a sensor operable to provide a signal representative of the operating state of the trowel upon engine start-up; and an electronic controller that receives the signal representative of the operating state of the trowel from the sensor and that is responsive to the signal to prevent the clutch from engaging if the detected operating state is outside of a designated range during engine start-up, thereby preventing torque transfer to the rotor and which thereafter cannot prevent the clutch from engaging in response to signals from the sensor, thereby permitting torque transfer to the rotor.

2. A starter module for an engine of a walk behind trowel having a rotor driven by the engine, the rotor including a shaft and a plurality of concrete-finishing blades driven by the shaft, the engine having a throttle to command an operating state of the trowel, and a clutch operable to selectively couple an output of the engine to the rotor shaft, the starter module comprising:

a sensor operable to provide a signal representative of the operating state of the trowel upon engine start-up; and a controller configured to receive the signal representative of the operating state of the trowel from the sensor and to prevent the clutch from engaging and, thereby prevent torque transfer to the rotor shaft if the detected operating state is outside of a designated range during engine start-up and which thereafter cannot prevent the clutch from engaging in response to signals from the sensor, wherein the engine has an actual engine speed, wherein the operating state is a commanded engine speed, wherein the designated range is below a designated threshold, and wherein the controller is configured to prevent the clutch from engaging if the commanded engine speed is at or above the designated threshold.

3. The starter module of claim 2, wherein the controller is configured such that if the commanded engine speed is at or above the designated threshold, the controller electrically snubs the engine to maintain the actual engine speed under the designated threshold until the commanded engine speed is reduced below the designated threshold, the snubbing comprising grounding a previously generated ignition signal rather than transmitting the ignition signal to a spark plug of the engine.

4. The starter module of claim 3, wherein the snubbing comprises grounding the signal rather than transmitting it to an ignition coil that supplies power to the spark plug.

5. The starter module of claim 4, wherein the electrical signal includes a plurality of electrical pulses occurring over a number of consecutive periods, wherein the controller electrically snubs a portion of the electrical pulses in each period, and wherein the controller causes an unsnubbed portion of electrical pulses to be transmitted to the ignition coil in each period to sustains operation of the engine for that period.

6. The starter module of claim 5, wherein the unsnubbed portion of electrical pulses is at least two consecutive electrical pulses per period.

7. The starter module of claim 2, wherein the controller prevents the clutch from engaging until the commanded operating speed falls below the designated threshold of the engine speed for at least a predetermined time period.

8. The starter module of claim 7, wherein the predetermined time period is one second.

9. The starter module of claim 2, further comprising a switch electrically connected to an electrical ground and in parallel with a train of electrical pulses to drive the engine, wherein the controller is configured to close the switch to electrically snub a portion of the train of electrical pulses by grounding the portion of the train rather than transmitting it to the engine.

10. The starter module of claim 2, wherein the controller is configured to determine the commanded engine speed based on a frequency of a plurality of electrical pulses to drive the engine, and wherein the designated threshold is represented by a threshold pulse frequency.

11. The starter module of claim 10, wherein the controller is configured such that, upon detecting the frequency of electrical pulses above the threshold pulse frequency, the controller electrically snubs the plurality of electrical pulses and reduces the actual engine speed.

12. The starter module of claim 11, wherein the controller electrically snubs the electrical pulses to drive the engine until the frequency of the electrical pulses is below the threshold pulse frequency for at least one second.

13. The starter module of claim 10, wherein the throttle is manually actuatable to set the commanded engine speed and therefore set the frequency of electrical pulses to drive the engine.

14. The starter module of claim 2, wherein the clutch engages automatically at a clutch engine speed and the designated threshold is no higher than the clutch engagement speed.

15. The starter module of claim 14, wherein the designated threshold is a clutch engagement speed.

16. A walk behind trowel, comprising:
an engine operable to provide an engine output;
a throttle operable to regulate an engine operating speed;
a rotor driven by the engine output and having a shaft and a plurality of concrete finishing blades mounted on the shaft;
a clutch operable to selectively engage the output of the engine to the rotor shaft to rotate the rotor;
a sensor operable to provide a signal representative of an operating state of the trowel upon engine start-up; and
an electronic controller that receives the signal from the sensor and that is responsive to the signal prevent the clutch from engaging the engine output to the shaft of the rotor if the detected operating state is outside a designated range during engine start-up and which thereafter cannot prevent the clutch from engaging in response to signals from the sensor.

17. A walk behind trowel, comprising:
an engine operable to provide an engine output;
a throttle operable to regulate an engine operating speed;
a rotor driven by the engine output and and including a rotatable shaft and a plurality of concrete-finishing blades mounted on the shaft;
a clutch operable to selectively engage the output of the entitle to the rotor shaft;
a sensor operable to provide a signal representative of the an operating state of the trowel upon engine start-up;
a frame supporting the engine and having a handle extending therefrom; and
a controller configured to detect an operating state of the trowel, and to prevent the clutch from engaging the engine output to the rotor if the detected operating state is outside a designated range during engine start-up to prevent rotation of the frame and handle relative to the blades and which thereafter cannot prevent the clutch from engaging in response to signals from the sensor,
wherein the engine has an actual engine speed,
wherein the operating state is a commanded engine speed,
wherein the designated range is below a designated threshold, and
wherein the controller is configured to prevent the clutch from engaging if the controller detects the commanded engine speed is at or above the designated threshold, thereby preventing the rotor, frame, and handle from rotating.

18. The walk behind trowel of claim 17, wherein the engine includes an ignition coil that receives a plurality of electrical pulses to drive operation of the engine, wherein the controller is electrically connected to receive the plurality of electrical pulses to the ignition coil, and wherein the controller is operable to translate a frequency of the electrical pulses into the commanded engine speed.

19. The walk behind trowel of claim 18, further including a switch electrically connected to an electrical ground and in parallel to the ignition coil, wherein the controller closes the switch and electrically snubs at least a portion of the electrical pulses to the ignition coil to maintain an actual engine speed of the engine below the designated threshold, the snubbing comprising rounding the portion of the electrical pulses rather than communicating the portion to the ignition coil.

20. The walk behind trowel of claim 18, wherein controller continues to maintain the actual engine speed below the designated threshold until the commanded engine speed falls below the designated threshold.

21. The walk behind trowel of claim 18, wherein the controller is configured to stop electrically snubbing at least a portion of the electrically pulses when the actual engine speed equals or falls below the designated threshold for a predetermined time period.

22. The walk behind trowel of claim 17, wherein the engine includes an ignition coil that receives a plurality of electrical pulses to drive operation of the engine, and wherein the controller is configured to electrically snub at least a portion of the electrical pulses in order to reduce the actual engine speed below the designated threshold.

23. The walk behind trowel of claim 22, wherein a remaining unsnubbed portion of electrical pulses to the ignition coil sustains operation of the engine.

24. The walk behind trowel of claim 23, wherein the remaining portion of unsnubbed electrical pulses is at least two electrical pulses per engine cycle to sustain operation of the engine.

25. The walk behind trowel of claim 17, wherein the controller prevents the clutch from engaging until the actual engine speed falls below the designated threshold for a predetermined time period.

26. The walk behind trowel of claim 17, wherein the engine further comprises an ignition coil operable to receive a plurality of electrical pulses to drive operation of the engine, and further comprising a switch electrically connected to an electrical ground and in parallel with the ignition coil, wherein the controller is configured to activate the switch to electrically snub the plurality of electrical pulses to the ignition coil by grounding the electrical pulses rather than communicating the electrical pulses to the ignition coil.

27. The walk behind trowel of claim 26, wherein the controller is configured to translate a frequency of the electrical pulses to the ignition coil to the actual engine speed, and wherein the designated threshold is represented by a threshold pulse frequency.

28. The walk behind trowel of claim 27, wherein when the controller detects the frequency of electrical pulses to fall below the threshold pulse frequency, the controller opens the switch to stop snubbing the electrical pulses to the ignition coil.

* * * * *